(12) United States Patent
Barile et al.

(10) Patent No.: US 6,831,570 B2
(45) Date of Patent: Dec. 14, 2004

(54) METHOD AND APPARATUS TO SELECT CONTENT

(75) Inventors: Steven E. Barile, Portland, OR (US); Genevieve Bell, Portland, OR (US); Scott D. Mainwaring, Portland, OR (US); Timothy L. Brooke, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 452 days.

(21) Appl. No.: 09/957,055

(22) Filed: Sep. 19, 2001

(65) Prior Publication Data

US 2003/0052794 A1 Mar. 20, 2003

(51) Int. Cl.[7] .......................... G08C 19/00; G05B 19/02
(52) U.S. Cl. .............................. 340/825.69; 340/825.22
(58) Field of Search ....................... 340/825.69, 825.72, 340/825.22, 825.24, 825.29; 348/734, 6, 10, 12, 13, 563, 564, 906; 725/42, 40, 39, 51, 52; 345/327; D13/168

(56) References Cited

U.S. PATENT DOCUMENTS

| | | | |
|---|---|---|---|
| 5,410,326 A | | 4/1995 | Goldstein |
| 5,625,608 A | * | 4/1997 | Grewe et al. ............ 369/24.01 |
| 5,646,608 A | | 7/1997 | Shintani |
| D386,184 S | * | 11/1997 | Heimburger ............... D14/218 |
| 6,040,829 A | * | 3/2000 | Croy et al. ................. 345/864 |
| 6,137,794 A | * | 10/2000 | Brown ....................... 370/360 |
| 6,169,543 B1 | * | 1/2001 | Wehmeyer ................... 725/47 |
| 6,371,829 B1 | * | 4/2002 | Kato et al. .................. 446/456 |
| 6,374,164 B1 | * | 4/2002 | Eklind et al. .................. 701/2 |
| 6,447,362 B2 | * | 9/2002 | Khamphilavong et al. .. 446/227 |
| 6,564,379 B1 | * | 5/2003 | Knee et al. ................... 725/42 |

FOREIGN PATENT DOCUMENTS

| | | |
|---|---|---|
| JP | 2000 175145 | 6/2000 |
| WO | WO 99/60782 | 11/1999 |

\* cited by examiner

*Primary Examiner*—Michael Horabik
*Assistant Examiner*—Nam V Nguyen

(57) ABSTRACT

A remote control device is configured to select predetermined content prior to providing the remote control device to a media consumer, and provided to the media consumer such that the media consumer associates the remote control device with the predetermined content. In one embodiment, the remote control device is configured to select at least one predetermined content and has a form that identifies the predetermined content for the media consumer.

18 Claims, 2 Drawing Sheets

1

METHOD AND APPARATUS TO SELECT CONTENT

FIELD

The invention relates to remote control devices. More particularly, the invention relates to selecting content via remote control for consumption by a media consumer.

BACKGROUND

Remote control devices are popular with media consumers—people who experience images, sounds, and other sensations produced and provided by other people. For example, stereo and television remote controls are very popular with audio and video media consumers. Remote controls provide a convenient mechanism by which media consumers may interactively select content for consumption.

Currently, remote controls for selecting content are general purpose devices for selecting content channels. For example, many remote controls offer controls for selecting a particular channel by number, and for incrementing or decrementing the currently selected channel. Operating a control of the remote control may result in receiving whatever content is currently available on the selected channel. The remote control is not associated with any particular content; rather, it is a general-purpose device for selecting content channels or other consumer electronics equipment controls.

Furthermore, existing remote controls do not facilitate the identification of the particular content (as opposed to the channel) which operating the remote control will select. A media consumer must know in advance which channel will provide the content they seek to consume, and the times at which that content will be provided.

FIGURES

The invention may be better understood with reference to the following figures in light of the accompanying description. The present invention, however, is limited only by the scope of the claims at the concluding portion of the specification.

DETAILED DESCRIPTION

In the following description, references to "one embodiment" or "an embodiment" do not necessarily refer to the same embodiment, although they may. Various operations of the description below and the claims are described in terms of software, e.g. instructions executed by a processor, either a general purpose processor, or a more task-specific processor such as an embedded processor or digital signal processor. However, the various operations may of course be embodied by software, hardware, firmware, or a combination thereof.

An embodiment of the present invention comprises a remote control device that itself acts as an indicator of predetermined content that a media consumer desires to consume. Embodiments of the present invention include a remote control device in the shape of a particular object that indicates and selects the content. Operation of the remote control device causes the display or other rendering of the predetermined content for the consumer.

Figure 1:
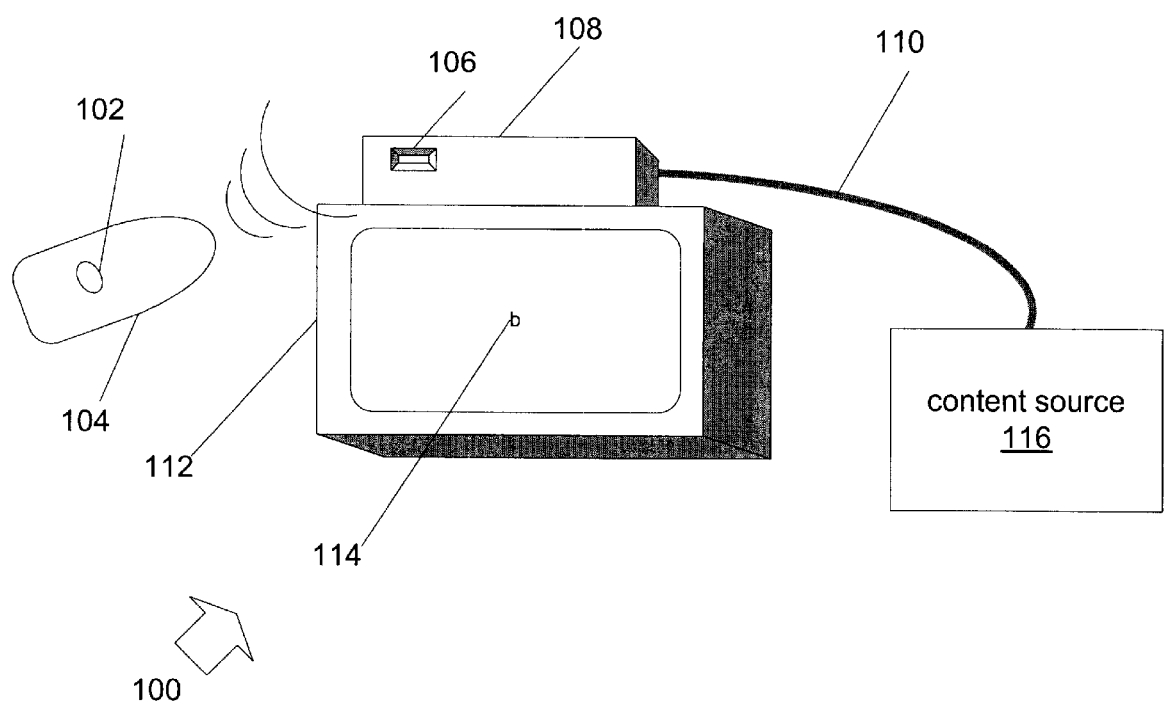
FIG. 1 shows an embodiment of a system in accordance with the present invention.

FIG. 1 shows an embodiment of a system in accordance with the present invention. A video display technology 112 comprises a display surface 114 to display images and sequences of images, such as videos. Examples of video display technologies include televisions and computer displays. Video 112 may be coupled by way of a receiver 108 to a content source 116. In embodiment 100, the receiver may comprise various devices, including a set-top box, a video cassette recorder (VCR), a personal or laptop or handheld computer, and so on. The content source 116 may comprise a television broadcast station, an Internet site that transmits content in a unicast, multicast, or broadcast fashion, a digital versatile disk player (DVD), and other sources of content.

Other embodiments may comprise technology for receiving and rendering audio content. In such embodiments, device 112 may comprise speakers to render audio content, receiver 108 may comprise an audio receiver device such as a stereo receiver, and content source 116 may comprise a radio broadcast station, an Internet web site which provides streaming or downloadable audio content, or a compact disk (CD) or other type of media player device. Of course, these are only some of numerous possibilities contemplated within the scope of the present invention.

The content source 116 and the receiver 108 may be coupled by way of a signal path 110. The signal path 110 may comprise numerous technologies, including wireless technologies, cable, and telephone wiring. Of course, the receiver 108 may be coupled to receive content from other content sources than source 116 as well.

It should also be appreciated that the receiver 108 may be integral with display technology 112. For example, some computers have video displays and speakers build in.

In the embodiment 100, the receiver 108 comprises a detector 106 to receive remote control signals from a remote control device 104. The remote control device 104 comprises at least one control 102 which, when operated by a media consumer (a person who desires to experience media content), may transmit the remote control signal to the detector 106 of the receiver 108.

In accordance with the present invention, the remote control device 104 may be adapted such that operation of control 102 results in the receiver 108 receiving preselected, predetermined content from the content source 116. The remote control device 104 may be programmed by a manufacturer, distributor, or other entity to select the predetermined content when activated by a media consumer. The remote control device may be non-programmable by the media consumer, and may be associated with the predetermined content at a time prior to providing the remote control 104 to the media consumer. For example, operating control 102 may result in the receiver 108 receiving a musical selection, a television program, a movie, a sporting event, a preview video clip, a movie trailer clip, pre-selected pay-by-time or pay-per-view content, a musical concert, a pre-selected advertisement, or any other audio, visual, or audio-visual content, pre-selected and associated with the remote control device prior to providing the remote control device to the media consumer. That is, the remote control device is no longer a general purpose remote control, but a special purpose remote control for selecting the content previously determined by the remote control provider.

Figure 2:
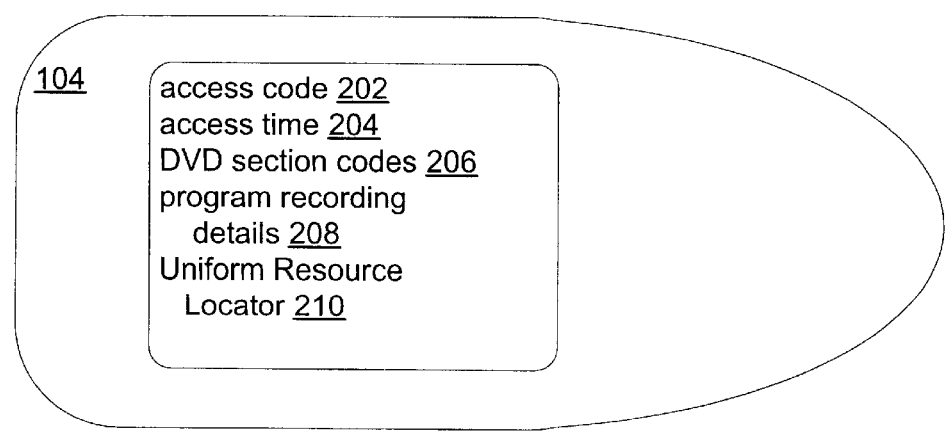
FIG. 2 shows an embodiment of a remote control device in accordance with the present invention.

FIG. 2 shows an embodiment of remote control device 104 formed with logic to cause receiver 108 to receive predetermined content. Remote control device 104 may be structured with logic and/or circuitry to include an access code 202 and an access time 204. Logic and/or circuitry within a remote control device to provide one or more controls and associated data is well-known to those skilled in the art and will not be described in further detail herein. The access code 202 may identify content associated with the access code 202, and provided by the content source 116. Also, the access code 202 may be applied to the content source 116 to enable the receiver 108 to receive access-protected content, such as pay-per-view or pay-by-time content. The access code 202 and the access time 204 may cause the receiver 108 to tune to the content source 116 and to receive the associated content for a period of time according to the access time 204. For example, in response to receipt of the access code 202 and the access time 204, the receiver 108 may receive pay-per-view or pay-by-time content from the content source 116 for a period of ten minutes. This may provide a sampler, preview, or promotional consumption of the content by the media consumer, and may lead to the media consumer providing payment for additional content beyond that which is provided in the sampler, preview, or promotion.

In another embodiment, the content source 116 may comprise a digital versatile disk (DVD) player coupled to the receiver 108 by way of a coaxial cable, fiber optic cable, or other technology. The remote control device 104 may comprise logic and/or circuitry to include DVD section codes 206. The DVD section codes 206 may identify sections of DVD content that may be independently accessed. For example, the section codes 206 may identify the introduction of a digital movie, a fight scene, a love scene, the credits, interviews with the actors and the director, outtakes, and so on. Operating the control 102 may result in the receiver 108 receiving the different DVD sections identified by the codes 206. Of course, the remote control device 104 might comprise multiple controls, each corresponding to a DVD section or individual content portion. Operating a corresponding control may result in the receiver 108 receiving content of the corresponding DVD section. A remote control device embodiment 104 comprising DVD sections codes may be provided in conjunction with a DVD disk, for example, attached to or included in the DVD disk case.

In another embodiment, the receiver 108 may comprise a video cassette recorder (VCR). The remote control device 104 may comprise logic and/or circuitry to include program recording details 208. Operating the control 102 of the remote control device 104 may program the receiver 108 to receive and record predetermined content from the content source 116. For example, the recording details 208 may comprise a channel identifier, a recording date, a start recording time, and an end recording time to record a television broadcast or other content. Operation of the control 102 may result in providing these recording details to the receiver 108, in which case the receiver 108 may be programmed to receive the predetermined content of the identified channel on the identified date, during the identified time interval, according to a clock by which the receiver 108 operates.

In another embodiment, the remote control device 104 may comprise an identification 210 of content stored on a computer network. For example, identification 210 may comprise a Uniform Resource Locator of a media file, such as an audio or video file, stored on a computer of the Internet. The content of the media file may be streamed or downloaded to the receiver 108 in response to operating the remote control device 104.

The receiver 108 may be adapted to accept and respond to commands to select predetermined content, such commands received from the remote control device. For example, the receiver 108 may be adapted to accept and respond to receipt of the access code 202 and access times 204, so that the receiver 108 may negotiate receipt of the content from the content source 116 for the identified period of time. Other adaptations to the receiver may include logic to interpret and respond to the receipt of commands to select particular DVD section codes. The receiver 108 may be adapted to locate and receive content from media files identified by URLs provided by the remote control device 104. These are only a few of the possible adaptations that are possible to the receiver 108, according to the implementation.

Figure 3:
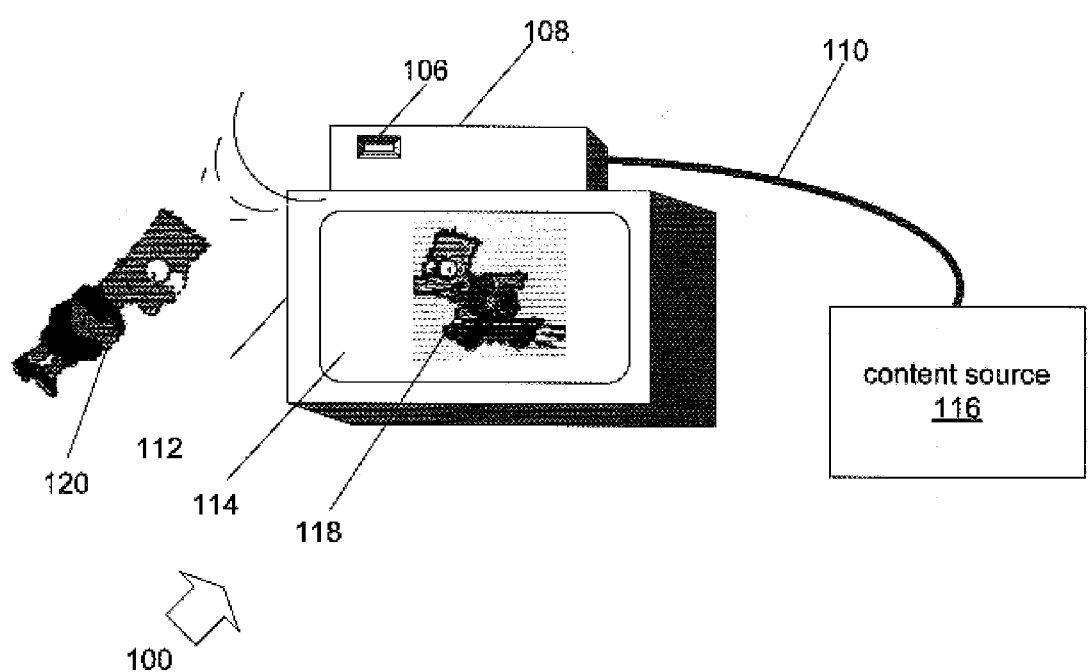
FIG. 3 shows an embodiment of a system in accordance with the present invention.

FIG. 3 shows an embodiment 120 of a remote control device in accordance with the present invention. In one embodiment, the remote control device 120 is formed as a character good known by consumers to be associated with the predetermined content so as to identify the content associated with the operation of the remote control device. Hence, the remote control device 120 may be formed to identify to the media consumer the content that the receiver 108 will receive as a result of the operation of the remote control device. In one embodiment, the remote control device 120 is formed in the likeness of a character, prop, or other object associated with the content. For example, the remote control device may be formed as a doll representative of the Bart Simpson character of "The Simpsons" television program, for example. Operating the remote control device 120 may result in the receiver 108 receiving content 118 including the Bart Simpson character (e.g., "The Simpsons" television program). The remote control device 120 may be operated by operating a control 102, or in one embodiment by simply squeezing or otherwise manipulating or interacting with the remote control device. In one embodiment, the remote control device comprises only a single control for selecting the content. This may be advantageous for operation by small children, for example. Operation of the single control may commence rendering of the predetermined content for the media consumer.

In one embodiment, the remote control device may be programmed to be operable for a single use, or for a limited pre-determined number of uses. That is, the remote control device may operate to select the identified content only a predetermined number of times, after which the remote control device becomes nonfunctional for content selection. In a sense, the remote control device becomes disposable. As such, the disposable remote control device may be used in a variety of content marketing schemes (e.g., to promote television programs, movies, sporting events, and the like).

The remote control device may be formed into a selected character, prop, or other object associated with selected content and may be provided as a promotional item in conjunction with the marketing of the content. For example, for access to the "Barney" television program, the remote control device may be formed into the shape of the Barney character, and when a child squeezes the remote control device, the receiver may be tuned so as to receive the "Barney" television program. To advertise the program, the remote control device may be sold or given away to consumers in order to promote increased viewing of the television program. In another example, the remote control device may be formed into the shape of a sports item (possibly including the logo of a local professional sports team), which when operated causes the display and/or recording of a current televised sporting event.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:

forming a special purpose remote control device, such that the appearance of the special purpose remote control device functions to identify predetermined content to a consumer; and configuring the remote control device to select and cause the rendering of only the predetermined content when activated by the consumer, the remote control device being operable for only a predetermined number of uses.

2. The method of claim 1, wherein configuring the special purpose remote control device to select the predetermined content further comprises:

configuring the special purpose remote control device with logic to select at least a portion of one of pay-per-view content and pay-by-time content.

3. The method of claim 1, wherein configuring the special purpose remote control device to select predetermined content further comprises:

configuring the special purpose remote control device with logic to select at least one of a musical selection, a television program, a movie, a musical concert, a sporting event, a preview video clip, a trailer video clip, and an advertisement.

4. The method of claim 1, wherein configuring the special purpose remote control device to select predetermined content further comprises:

configuring the special purpose remote control device with logic to select a section of DVD content.

5. The method of claim 1, wherein configuring the special purpose remote control device to select predetermined content further comprises:

configuring the special purpose remote control device with logic to configure a receiving device to record the predetermined content instead of rendering the predetermined content.

6. The method of claim 1, wherein configuring the special purpose remote control device to select predetermined content further comprises:

configuring the special purpose remote control device with logic to configure a receiving device to select predetermined content available on a computer network.

7. The method of claim 1, wherein the special purpose remote control device is formed in the shape of a character good identifying the predetermined content to the consumer.

8. An apparatus comprising:

a special purpose remote control device configured to select predetermined content and be operable for only a predetermined number of uses, and whose appearance functions to identify the predetermined content to a consumer, wherein activation of the special purpose remote control device by the consumer causes the rendering of only the predetermined content for perception by the consumer.

9. The apparatus of claim 8, wherein the special purpose remote control device is configured to be operable for only a single use by the consumer.

10. The apparatus of claim 8, wherein the special purpose remote control device is formed in the shape of a character good identifying the predetermined content to the consumer.

11. The apparatus of claim 8, wherein the special purpose remote control device is formed in the shape of an object identifying the predetermined content to the consumer.

12. The apparatus of claim 8, wherein the special purpose remote control device comprises a single control, which when activated, causes the rendering of only the predetermined content for perception by the consumer.

13. The apparatus of claim 8, wherein the special purpose remote control device is programmed to select, when activated, the predetermined content prior to distribution to the consumer and the special purpose remote control device is non-programmable by the consumer.

14. The apparatus of claim 8, further comprising:

logic to select at least a portion of one of pay-per-view content and pay-by-time content.

15. The apparatus of claim 8, further comprising:

logic to select at least one of a musical selection, a television program, a movie, a musical concert, a sporting event, a preview video clip, a trailer video clip, and an advertisement.

16. The apparatus of claim 8, further comprising:

logic to select a section of DVD content.

17. The apparatus of claim 8, further comprising:

logic to configure a receiving device to record the predetermined content instead of rendering the predetermined content.

18. The apparatus of claim 8, further comprising:

logic to configure a receiving device to select predetermined content available on a computer network.

* * * * *